United States Patent
Vijithakumara (10) Patent No.: US 11,312,329 B2
(45) Date of Patent: Apr. 26, 2022

(54) KEY FOB COMMUNICATION CONTROL

(71) Applicant: Toyota Motor North America, Inc., Plano, TX (US)

(72) Inventor: Evan A. Vijithakumara, Frisco, TX (US)

(73) Assignee: Toyota Motor North America, Inc., Plano, TX (US)

( * ) Notice: Subject to any disclaimer, the term of this patent is extended or adjusted under 35 U.S.C. 154(b) by 0 days.

(21) Appl. No.: 17/007,386

(22) Filed: Aug. 31, 2020

(65) Prior Publication Data

US 2022/0063561 A1 Mar. 3, 2022

(51) Int. Cl.
*B60R 25/20* (2013.01)
*G07C 9/00* (2020.01)

(52) U.S. Cl.
CPC ...... *B60R 25/2072* (2013.01); *G07C 9/00309* (2013.01); *B60R 2325/10* (2013.01); *G07C 2009/00349* (2013.01); *G07C 2009/00984* (2013.01); *G07C 2209/63* (2013.01)

(58) Field of Classification Search
CPC ............ B60R 25/2072; B60R 2325/10; B60R 25/245; G07C 9/00309; G07C 2209/63; G07C 2009/00984; G07C 2009/00349
USPC ................................................ 340/5.64, 5.72
See application file for complete search history.

(56) References Cited

U.S. PATENT DOCUMENTS

| | | | |
|---|---|---|---|
| 4,595,902 A * | 6/1986 | Proske | B60R 25/24 340/5.64 |
| 6,429,768 B1 * | 8/2002 | Flick | B60R 25/04 307/10.5 |
| 8,164,416 B2 | 4/2012 | Lee et al. | |
| 8,798,809 B2 | 8/2014 | Kalhous et al. | |
| 9,210,188 B2 | 12/2015 | Choi et al. | |
| 9,311,586 B2 | 4/2016 | Robinette et al. | |
| 9,940,764 B2 | 4/2018 | Van Wiemeersch et al. | |
| 2006/0164282 A1 * | 7/2006 | Duff | G01S 7/38 342/14 |
| 2007/0001828 A1 * | 1/2007 | Martinez | H04W 48/02 340/426.25 |
| 2007/0075145 A1 * | 4/2007 | Arendonk | G06K 19/0723 235/492 |
| 2009/0061759 A1 * | 3/2009 | Stoddard | H04K 3/41 455/1 |
| 2014/0070921 A1 | 3/2014 | Jansseune | |
| 2015/0145645 A1 * | 5/2015 | Stanfield | G07C 9/00896 340/5.61 |
| 2016/0036556 A1 * | 2/2016 | Liberti | H04K 3/224 455/63.1 |

(Continued)

FOREIGN PATENT DOCUMENTS

GB 2576133 A 2/2020
WO WO-2020002921 A1 * 1/2020 ......... G07C 9/00309

*Primary Examiner* — Edwin C Holloway, III
(74) *Attorney, Agent, or Firm* — Christopher G. Darrow; Darrow Mustafa PC (57) ABSTRACT

Communication with a key fob of a vehicle can be controlled based on a key fob jamming condition. One or more sensors can be configured to detect the key fob jamming condition. In response to the key fob jamming condition being detected, a jamming device can be activated to cause one or more jamming signals to be emitted. The one or more jamming signals can prevent the key fob from receiving and responding to other signals.

20 Claims, 4 Drawing Sheets

(56) References Cited

U.S. PATENT DOCUMENTS

2017/0057353 A1* 3/2017 Griffin ................ B60K 28/063
2017/0294062 A1* 10/2017 Van Wiemeersch ........................
G07C 9/00309

* cited by examiner

```
┌─────────────────────────────────────────────────────┐
│ Determining whether a key fob jamming condition is detected │
│                        310                          │
└─────────────────────────────────────────────────────┘
                          ↓
┌─────────────────────────────────────────────────────┐
│  Automatically activating a jamming device to cause one or │
│       more jamming signals to be emitted            │
│                        320                          │
└─────────────────────────────────────────────────────┘
```

KEY FOB COMMUNICATION CONTROL

FIELD

The subject matter described herein relates in general to remote keyless systems and, more particularly, to controlling remote keyless system communication.

BACKGROUND

Some vehicles are equipped with remote keyless systems. Remote keyless systems can include remote keyless entry systems which can be used to secure a vehicle, electronically locking and/or unlocking the vehicle doors remotely. Remote keyless systems can include remote keyless ignition systems which can be used to start a vehicle, electronically activating the ignition remotely.

SUMMARY

In one respect, the subject matter presented herein relates to a communication control method for a key fob of a vehicle. The method can include determining whether a key fob jamming condition is detected. The method can include, in response to determining that the key fob jamming condition is detected, automatically activating a jamming device to cause one or more jamming signals to be emitted. The one or more jamming signals can prevent the key fob from receiving and responding to other signals.

In another respect, the subject matter presented herein relates to a communication control system for a key fob of a vehicle. The system can include one or more sensors. The system can include one or more jamming devices. The system can include one or more processors. The one or more processors can be programmed to initiate executable operations. The executable operations can include determining whether a key fob jamming condition is detected. The executable operations can further include, in response to determining that the key fob jamming condition is detected, automatically activating a jamming device to cause one or more jamming signals to be emitted. The one or more jamming signals can prevent the key fob from receiving and responding to other signals.

In still another respect, the subject matter described herein relates to a communication control computer program product for a key fob of a vehicle. The computer program product can include a non-transitory computer readable storage medium having program code embodied therein. The program code can be executable by a processor to perform a method. The method can include determining whether a key fob jamming condition is detected. The method can include, in response to determining that the key fob jamming condition is detected, automatically activating a jamming device to cause one or more jamming signals to be emitted. The one or more jamming signals prevent the key fob from receiving and responding to other signals.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Vehicles can include a remote keyless system such as remote keyless entry system and/or a remote keyless ignition system. A portion of the remote keyless system is located in the vehicle. Another portion of the remote keyless system is a portable device that can be carried by a user. The portable device can also be referred to as a "key fob" and/or a "smart key". The key fob can communicate with the remote keyless system within the vehicle to lock and/or unlock the vehicle doors, and/or start the vehicle using electronic signals. The electronic signal can be carried on any suitable frequency. Typically, the electronic signal is carried on the radio spectrum, specifically in the 300-400 MHz band.

The electronic signal from a key fob that is far from a vehicle and not within the communication range of the vehicle can be intercepted by an unauthorized entity in what is known as a relay attack. The intercepted electronic signal can be used to gain access to the vehicle. As an example of a relay attack, the unauthorized entity can pick up the electronic signal being broadcast by the vehicle. The unauthorized entity can relay the electronic signal to the key fob using intermediate boosters or repeaters. The key fob, upon receiving the electronic signal, can transmit a response signal as if the key fob is near the vehicle. The unauthorized entity can receive the response signal through the intermediate booster or repeaters and can transmit the intercepted signal received from the key fob to the vehicle. In response, the remote keyless entry system may unlock the vehicle doors, granting the unauthorized entity access to the vehicle. As another example, the unauthorized entity can transmit the intercepted signal received from the key fob to the vehicle, and in response, the remote keyless ignition system may activate the vehicle ignition, starting the vehicle.

According to arrangements herein, the likelihood of a successful relay attack can be reduced by preventing the key fob from receiving the signal originating from an unauthorized entity. A jamming device in close proximity with the key fob can prevent the key fob from receiving signal when the jamming device emits a jamming signal. The jamming device can be in form of a tag or a fob and can share a key holder with the vehicle key fob.

As an example, the jamming device can determine when the jamming device and/or the key fob are not close to the vehicle or outside the communication range of the vehicle, based on indicators described within this description. Based on the determination, the jamming device can automatically emit one or more jamming signals that prevent the key fob from communicating with (e.g., receiving signals from and/or sending signals to) any other entities. When the jamming device and the key fob are close to the vehicle or within the communication range of the vehicle, the jamming device can stop emitting the one or more jamming signals such that the key fob is capable of receiving signals from and/or sending signals to other entities.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
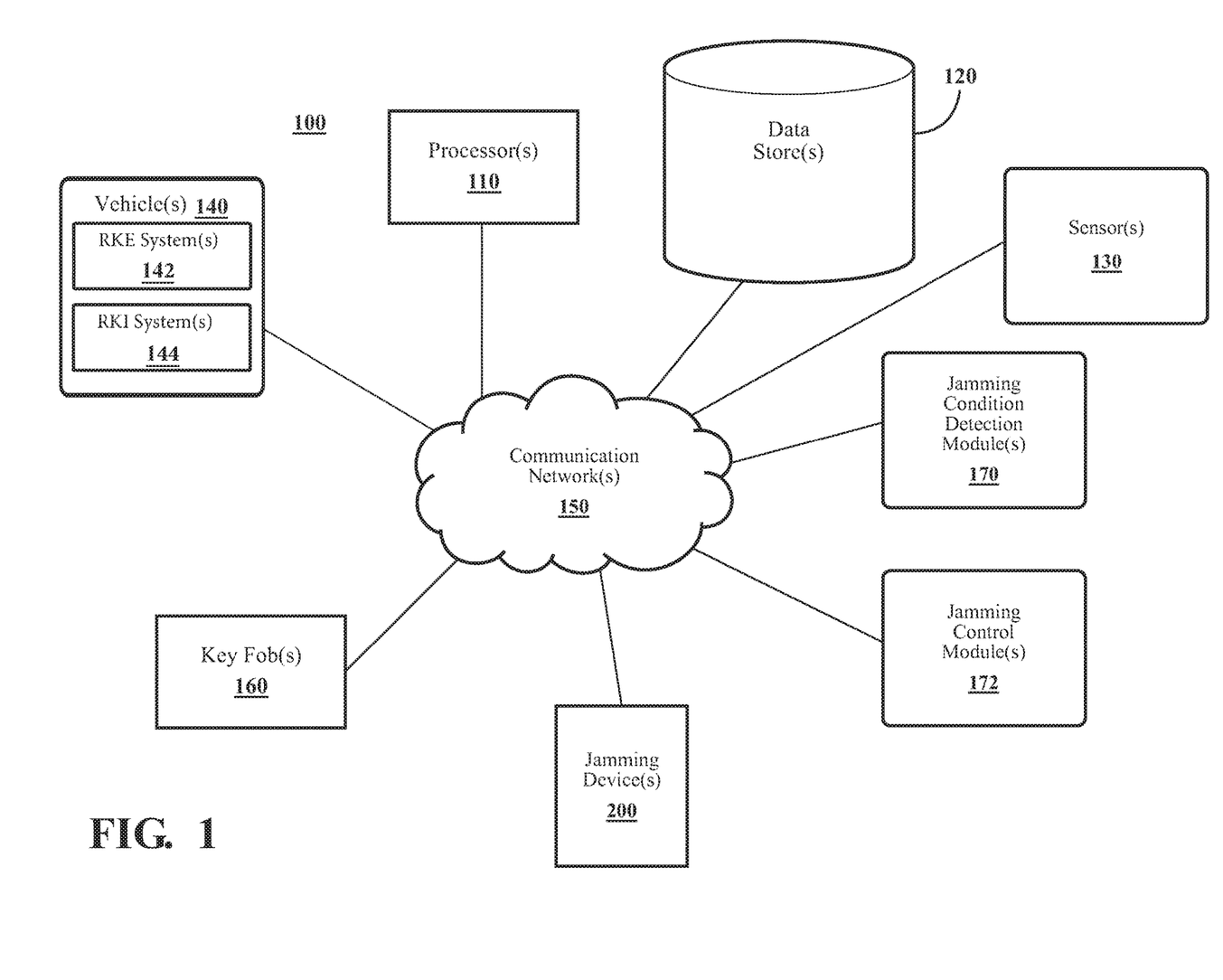
FIG. 1 is an example of a key fob communication control system.

FIG. 1 is an example of a key fob communication control system 100. Some of the possible elements of the key fob communication control system 100 are shown in FIG. 1 and will now be described. It will be understood that it is not necessary for the key fob communication control system 100 to have all of the elements shown in FIG. 1 or described herein. The key fob communication control system 100 can include one or more processors 110, one or more data stores 120, one or more sensors 130, one or more vehicles 140, one or more key fobs 160, one or more jamming condition detection modules 170, one or more jamming control modules 172, and/or one or more jamming device 200.

The various elements of the key fob communication control system 100 can be communicatively linked through one or more communication networks 150. As used herein, the term "communicatively linked" can include direct or indirect connections through a communication channel or pathway or another component or system. A "communication network" means one or more components designed to transmit and/or receive information from one source to another. The communication network(s) 150 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 150 further can be implemented as or include one or more wireless networks, whether short or long range. For example, in terms of short range wireless networks, the communication network(s) 150 can include a local wireless network built using a Bluetooth or one of the IEEE 802 wireless communication protocols, e.g., 802.11a/b/g/i, 802.15, 802.16, 802.20, Wi-Fi Protected Access (WPA), WPA2, Radio Frequency Identification (RFID) technology, or ultra-wide band technology. The communication network(s) 150 can include dedicated short-range communications (DSRC) technology and/or millimeter wave communications technology. In terms of long-range wireless networks, the communication network(s) 150 can include a mobile, cellular, and or satellite-based wireless network and support voice, video, text, and/or any combination thereof. Examples of long-range wireless networks can include GSM, TDMA, CDMA, WCDMA networks or the like.

The communication network(s) 150 can include wired communication links and/or wireless communication links. The communication network(s) 150 can include any combination of the above networks and/or other types of networks. The communication network(s) 150 can include one or more routers, switches, access points, wireless access points, and/or the like. In one or more arrangements, the communication network(s) 150 can include Vehicle-to-Infrastructure (V2I), or Vehicle-to-Everything (V2X) technology, which can allow for communications between the vehicle 140, the key fob 160, and/or the jamming device 200. One or more elements of the key fob communication control system 100 include and/or can execute suitable communication software, which enables two or more of the elements to communicate with each other through the communication network(s) 150 and perform the functions disclosed herein.

The key fob communication control system 100 can include one or more processors 110. "Processor" means any component or group of components that are configured to execute any of the processes described herein or any form of instructions to carry out such processes or cause such processes to be performed. The processor(s) 110 can be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors 110 can work in combination with each other.

The key fob communication control system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. The term "operatively connected," as used throughout this description, can include direct or indirect connections, including connections without direct physical contact.

The key fob communication control system 100 can include one or more vehicles 140. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle 140 can be any other type of vehicle that may be used on a roadway, such as a motorcycle. In some implementation, the vehicle can be a watercraft, an aircraft or any other form of motorized transport. The vehicle 140 can be a manual vehicle, an autonomous vehicle, or a semi-autonomous vehicle.

In one or more arrangements, the vehicle 140 can have a remote keyless entry (RKE) system 142 that includes electronic lock(s) that secure one or more doors of the vehicle 140 in a closed position, preventing entry into the vehicle 140. The RKE system 142 can be any RKE system, now known or later developed. In one or more arrangements, the vehicle 140 can have a remote keyless ignition (RKI) system 144 that includes an ignition that can be activated by, as an example, a push button in the presence of a key fob 160. The RKI system 144 can be any RKI system, now known or later developed. This description may refer to communication between the key fob(s) 160 and the vehicle 140. In such instances, it will be understood that such communication may be between the key fob(s) 160 and the vehicle 140, between the key fob(s) 160 and any component or system of the vehicle 140 (e.g., the RKE system 142 and/or the RKI system 144).

The vehicle 140 can be communicatively linked to one or more elements of the key fob communication control system 100 (e.g., key fob(s) 160). The vehicle(s) 140 can communicate with one or more elements of the key fob communication control system 100 using any suitable means of communication such as Wi-Fi, Bluetooth, RFID technology and/or ultra-wide band technology. As an example, the vehicle(s) 140 can communicate with the key fob(s) 160 and/or the jamming device 200 using Wi-Fi, Bluetooth, RFID technology and/or ultra-wide band technology. The communication can occur on any suitable basis (e.g., continuously, periodically, irregularly, in response to a command or input, randomly, etc.).

The key fob communication control system 100 can include one or more key fobs 160. The key fob 160 is an electronic device that can secure and/or grant access to an object such as, in this case, a vehicle 140. The key fob 160 can include a remote keyless entry device which can control the RKE system 142 of the vehicle 140. As an example and in some arrangements, electronic lock(s) of the vehicle 140 can be opened in response to a trigger. As an example, the trigger can be the key fob 160 and the vehicle 140 being within the communication range. In such an example, the RKE system 142 can emit a signal, unlocking the vehicle door(s) in response to detecting that the key fob 160 and the vehicle 140 are within the communication range.

As another example, the trigger can be based on a door handle being touched when the vehicle doors are locked. In such an example, a touch sensor on a door handle can detect a touch and transmit a signal to the remote keyless entry system, indicating that a user may be trying to gain access to the vehicle 140. In response to receiving a signal from the touch sensor and detecting that the key fob 160 and the vehicle 140 are within the communication range, the RKE system 142 can emit a signal, unlocking the vehicle door(s).

The key fob 160 can include a remote keyless ignition device which can control the RKI system 144 of the vehicle 140. As an example and in some arrangements, the ignition of the vehicle 140 can be activated and the vehicle 140 can be started in response to a trigger. The trigger can be based on an ignition pushbutton or a switch in the vehicle being depressed. In response to the ignition pushbutton or the switch being depressed and detecting that the key fob 160 and the vehicle 140 are within the communication range, the RKI system 144 can emit a signal, activating the ignition and starting the vehicle 140.

The vehicle 140 and the key fob 160 can communicate with each other when the vehicle 140 and the key fob 160 are within a communication range. It should be noted that, when reference is made to communication between the vehicle 140 and the key fob 160, it can include communication between the key fob 160 and any vehicle subsystem(s) (e.g., the RKE system 142, the RKI system 144, etc.). In some arrangements, the communication range can be based on an area surrounding the vehicle 140. In some arrangements, the communication range can be based on signal strength, such as whether the strength of a signal from the vehicle 140 that is above a signal strength threshold and/or the signal can be received without substantially no degradation. In some arrangements, the communication range can be based on the proximity between the vehicle 140 and key fob 160. The communication range can be based on an area within which the vehicle 140 can communicate with the key fob 160, and within which the key fob 160 can communicate with the vehicle 140. As such, when the vehicle 140 and the key fob 160 are within the communication range, the vehicle 140 and the key fob 160 can be configured to communicate and exchange information. When the vehicle 140 and the key fob 160 are outside the communication range, the vehicle 140 and the key fob 160 can be configured so that they do not communicate and exchange information.

The communication range can be based on proximity between the vehicle 140 and the key fob 160. The communication range can be based on a maximum reach of the signals being transmitted and received. As an example, the maximum reach can be set by a user or a manufacturer. In such an example, the maximum reach can be set to a distance from about 5 meters to about 20 meters. As another example, the maximum reach can be based on a maximum distance that an electronic signal can travel without degradation. In this case, the maximum reach can be limited by the type of technology being employed for signal transmission. Additionally, the reach of the signal and thus, the communication range can be affected by objects, such as walls, that the signal travels through.

As an example, the vehicle 140 and/or the key fob 160 can determine whether the vehicle 140 and/or the key fob 160 are within the communication range by calculating the time difference between when an inquiry signal was sent and when a response was received. The vehicle 140 can send an electronic signal to the key fob, inquiring whether the vehicle doors can be unlocked. The vehicle 140 can receive an electronic signal, responding to the inquiry. The vehicle can record the time the inquiry was sent and the time the response was received. Based on the recorded times and the travel speed of the inquiry signal and response signal, the RKE system 142 can determine the distance and/or proximity between the vehicle 140 and the key fob. In a case where the distance between the vehicle and the key fob 160 exceeds the communication range, the vehicle 140 can be configured to not respond to the key fob 160, and the key fob 160 can be configured to not respond to the vehicle 140. In such a case, the vehicle 140 may not unlock the vehicle doors or activate the vehicle ignition.

The key fob 160 associated with the vehicle 140 can communicate wirelessly with the vehicle 140 at an operational frequency range. The operational frequency range refers to one or more frequency bands on which the vehicle 140 and key fob 160 can transmit and receive electronic signals.

The key fob communication control system 100 can include one or more sensors 130. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the key fob communication control system 100 includes a plurality of sensors 130, the sensors 130 can work independently from each other. Alternatively, two or more of the sensors 130 can work in combination with each other. In such case, the two or more sensors 130 can form a sensor network. The sensor(s) 130 can include any suitable type of sensor. Various examples of different types of sensors 130 will be described herein. However, it will be understood that the embodiments are not limited to the particular sensors described.

The sensor(s) 130 can be configured to estimate and/or acquire data about distance and/or proximity using any suitable means. Specifically, the sensor(s) 130 can estimate and/or acquire information about the distance between the vehicle 140 and the sensor(s) 130. Additionally and/or alternatively, the sensor(s) 130 can sense the proximity between the vehicle 140 and the sensor(s) 130. Proximity can refer to whether the sensor(s) 130 are within a distance of the vehicle 140 and/or whether the sensor(s) 130 are within the communication range of the vehicle 140.

As an example, the sensor(s) 130 can use Bluetooth-based location tracking to determine proximity and/or determine distance. In such an example, the sensor(s) 130 can measure signal strength from the vehicle 140 to the sensor(s) 130. Based on the measured signal strength, the sensor(s) 130 can determine the proximity between the vehicle 140 and the sensor(s) 130. Further, the sensor(s) 130 can convert the measured signal strength to a distance estimate. As another example, the sensor(s) 130 can use Wi-Fi to determine proximity and/or estimate distance based on signal strength, time of flight (ToF) or time of arrival (ToA) of Wi-Fi signals from the vehicle 140. As another example, the sensor(s) 130 can use ultra-wideband to determine proximity and/or estimate distance by measuring the time it takes for a radio wave to travel between the vehicle 140 and the sensor(s) 130. As another example, the sensor(s) 130 can use RFID technology to determine proximity and/or estimate distance based on the travel speed of signals from the vehicle 140. As an example, the sensor(s) 130 can be configured to request a response signal from the vehicle 140 by emitting a request signal. Additionally or alternatively, the sensor(s) 130 can passively receive a signal from the vehicle 140.

The key fob communication control system 100 can include one or more jamming devices 200. The jamming device 200 can be configured to emit one or more jamming signals. The "jamming signal" can be any signal that can jam, block, disrupt, or interfere with inbound and/or outbound communication with the key fob. The jamming signals can be configured to prevent the one or more key fobs 160 from receiving and/or responding to other signals. The jamming signal(s) can be based on at least the operating frequency range of the key fob 160. As such, the jamming signal(s) and the signal(s) from and to the key fob 160 can be transmitted at the same frequency. Alternatively, the jamming signal(s) can be transmitted at one or more frequencies. As an example, the one or more frequencies can be determined based on frequencies known for key fob signal use. The jamming signal(s) can be transmitted at a higher amplitude than the signal from the key fob 160 so as to ensure effective jamming. The jamming device 200 can be in form of a tag or a fob. In some instances, the jamming device 200 can be located near the key fob 160. For instance, the jamming device 200 and the key fob 160 can be connected by a key holder (e.g., a key ring).

The jamming device 200 can be configured to be activated and/or deactivated. When the jamming device 200 is activated, the jamming device 200 can emit jamming signal(s), preventing the key fob 160 from receiving and/or responding to other signals. When the jamming device 200 is deactivated, the jamming device 200 may not emit jamming signals such that the key fob 160 is allowed to receive and respond to other signals. As alternative, when the jamming device 200 is deactivated, the jamming device 200 can emit one or more other jamming signals. In such an example, the jamming device 200 can emit the jamming signals and the other jamming signals. As such, the other jamming signals can jam or cancel the jamming signals such that the key fob 160 is allowed to receive and/or respond to other signals.

The key fob communication control system 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data stores 220 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The key fob communication control system 100 can include one or more jamming condition detection module(s) 170, and/or one or more jamming control module(s) 172. The jamming condition detection module(s) 170 can be configured to determine whether a key fob jamming condition is detected. The key fob jamming condition can be an event or a condition that occurs that makes the key fob 160 vulnerable to relay attacks. As an example, the key fob jamming condition can be based on a distance. As another example, the key fob jamming condition can based on proximity and/or a communication range. In such examples, beyond a certain distance, communication range and/or proximity between the key fob 160 and the vehicle 140, the key fob 160 can be unable to communicate with the vehicle 140. The signal(s) from the vehicle 140 and/or the key fob 160 can degrade over distance and in the case where the distance between the key fob 160 and the vehicle 140 is larger than the certain distance, the key fob 160 and/or the vehicle 140 can be vulnerable to relay attacks. The signal(s) from the vehicle 140 and/or the key fob 160 can degrade as the signal(s) travel through objects.

As an example, the jamming condition detection module(s) 170 can be configured to determine that the key fob jamming condition is detected when the estimated distance between the key fob 160 and the vehicle 140 exceeds a threshold distance. As another example, the jamming condition detection module(s) 170 can be configured to determine that the key fob jamming condition is detected when the key fob 160 is outside the communication range of the vehicle 140. The jamming condition detection module(s) 170 can receive the estimated distance and/or whether the key fob 160 is within or outside of the communication range of the vehicle 140 from the sensor(s) 130. As an example, the jamming condition detection module(s) 170 can compare the estimated distance to the threshold distance to determine whether a key fob jamming condition has occurred. In such an example and as previously mentioned, if the estimated distance exceeds the threshold distance, the jamming condition detection module(s) 170 can determine that the key fob jamming condition has been detected. As another example, the jamming condition detection module(s) 170 can receive a message from the sensor, indicating that the key fob is outside the communication range, and based on the message, the jamming condition detection module(s) 170 can determine that the key fob jamming condition has been detected. In the case that the key fob jamming condition is detected, the jamming condition detection module(s) 170 can output a signal to activate the jamming device 200. Alternatively and/or additionally, the jamming condition detection module(s) 170 can transmit a signal to the jamming control module(s) 172, indicating that the key fob jamming condition has been detected.

The jamming control module(s) 172 can be configured to automatically activate the jamming device 200 in response to the key fob jamming condition being detected. The jamming control module(s) 172 can determine the frequency and amplitude of the signals being emitted by the jamming device 200. The frequency and amplitude of the signal(s) can be programmable by a user. Alternatively, the frequency and amplitude of the signal(s) can be fixed by the manufacturer. Alternatively, the frequency and the amplitude of the signal(s) can be automatically detected based on the signals being transmitted by the vehicle 140 and the key fob 160.

It should be noted that the processor(s) 110, the data store(s) 120, the jamming condition detection module(s) 170, and/or the jamming control module(s) 172 can be located on the vehicle 140, the key fob(s) 160, and/or the jamming device 200. In some arrangements, the processor(s) 110, the data store(s) 120, the jamming condition detection module(s) 170, and/or the jamming control module(s) 172 can be located remote from the vehicle 140, the key fob(s) 160, and/or the jamming device 200. In some arrangements, the processor(s) 110, the data store(s) 120, the jamming condition detection module(s) 170, and/or the jamming control module(s) 172 can be located on any combination of the above.

Figure 2:
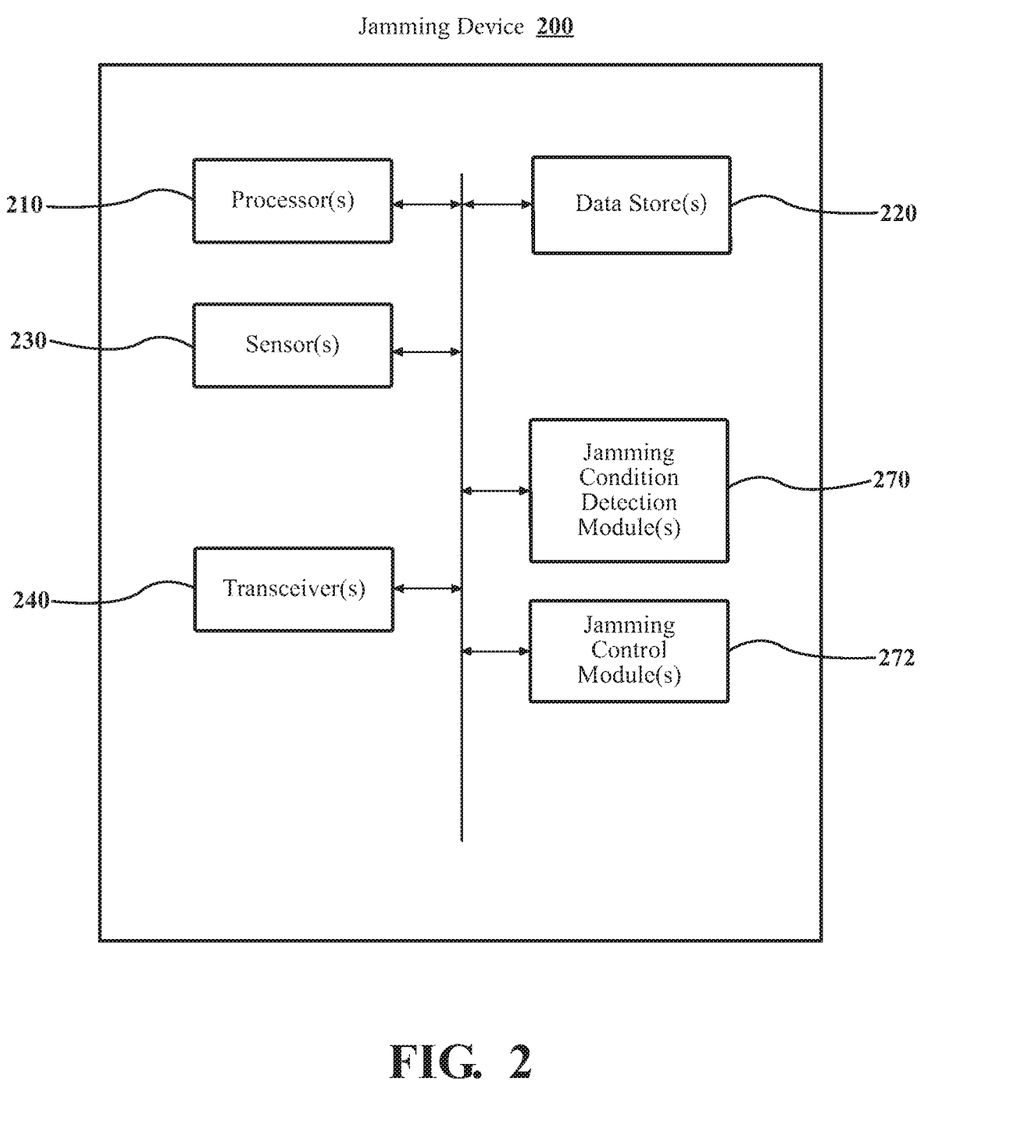
FIG. 2 is an example of a jamming device.

The jamming device 200 will now be described in greater detail. Referring to FIG. 2, an example of the jamming device 200 is shown. The jamming device 200 can include one or more processors 210, one or more data stores 220, one or more sensors 230, the jamming condition detection module(s) 270, and/or the jamming control module(s) 272. The above discussion of the processor(s) 110, the data store(s) 120, the sensor(s) 130, the jamming condition detection module(s) 170, and/or the jamming control module(s) 172 applies equally to the processor(s) 210, data store(s) 220, sensor(s) 230, the jamming condition detection module(s) 270, and/or the jamming control module(s) 272, respectively.

The jamming device 200 can include one or more signal generators. As used herein, "signal generator" is defined as a component or a group of components that generate signals with any suitable characteristics (e.g., amplitude, frequency and/or shape). In some arrangements, the signal generator(s) can be any suitable signal generators, now known or later developed.

The jamming device 200 can include one or more transceivers 240. As used herein, "transceiver" is defined as a component or a group of components that transmit signals, receive signals or transmit and receive signals, whether wirelessly or through a hard-wired connection. The transceiver(s) 240 can be configured to emit one or more jamming signals. The jamming signal(s) can be emitted with any suitable signal characteristics (e.g., at one or more frequencies, one or more amplitudes, one or more shapes, etc.). In some arrangements, the signal generator(s) can include the transceiver(s) 240.

The transceiver(s) 240 can be any suitable transceivers, now known or later developed. In some arrangements, the transceiver(s) 240 can be configured to can access a network, access point, node or other device for the transmission and receipt of data. The transceiver(s) 240 may be wireless transceivers using any one of a number of wireless technologies, now known or in the future. As an example, the transceiver can use ultra-wide band, RFID, Wi-Fi and/or Bluetooth.

Now that the various potential systems, devices, elements and/or components of the key fob communication control system 100 and the jamming device(s) 200 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 3:
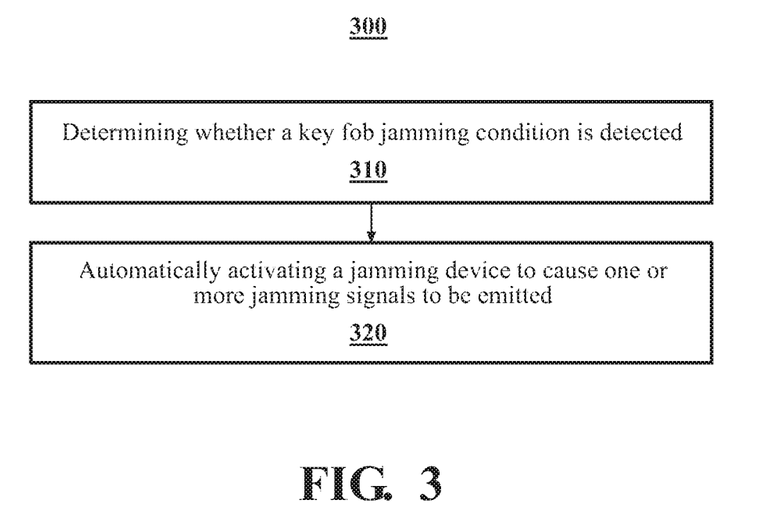
FIG. 3 is an example of a method for controlling communication with a key fob.

Turning to FIG. 3, an example of a method 300 for controlling communication with a key fob is shown. In one or more arrangements, the method 300 can be performed on the jamming device 200. At block 310, it can be determined whether a key fob jamming condition is detected. The key fob jamming condition can be determined by the jamming condition detection module(s) 170, 270. In some arrangements, the jamming condition can be determined based on sensor data received from the sensor(s) 130 or 230. The method 300 can continue to block 320.

At block 320, in response to determining that a key fob jamming condition has been detected, the jamming device 200 can be automatically activated to cause one or more jamming signals to be emitted. The jamming device 200 can be automatically activated by the jamming control module(s) 172, 272. As a result, the one or more jamming signals can prevent the key fob from receiving and/or responding to other signals.

The method 300 can end. Alternatively, the method 300 can return to block 310 or some other block. The method 300 can be repeated at any suitable point, such as at a suitable time or upon the occurrence of any suitable event or condition.

Figure 4A:
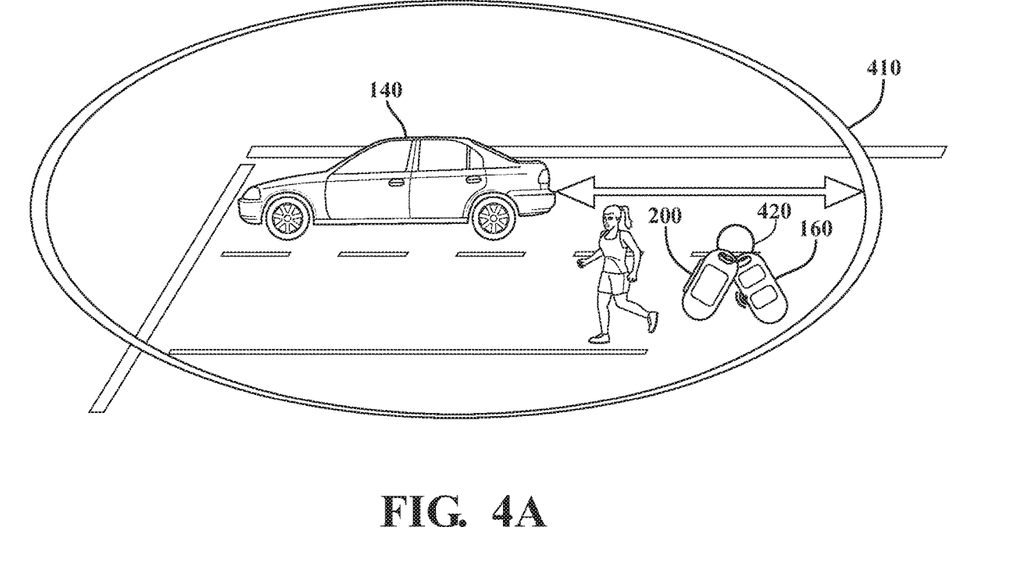
FIGS. 4A-4B are an example of a scenario in which communication with a key fob is controlled by a jamming device.
Figure 4B:
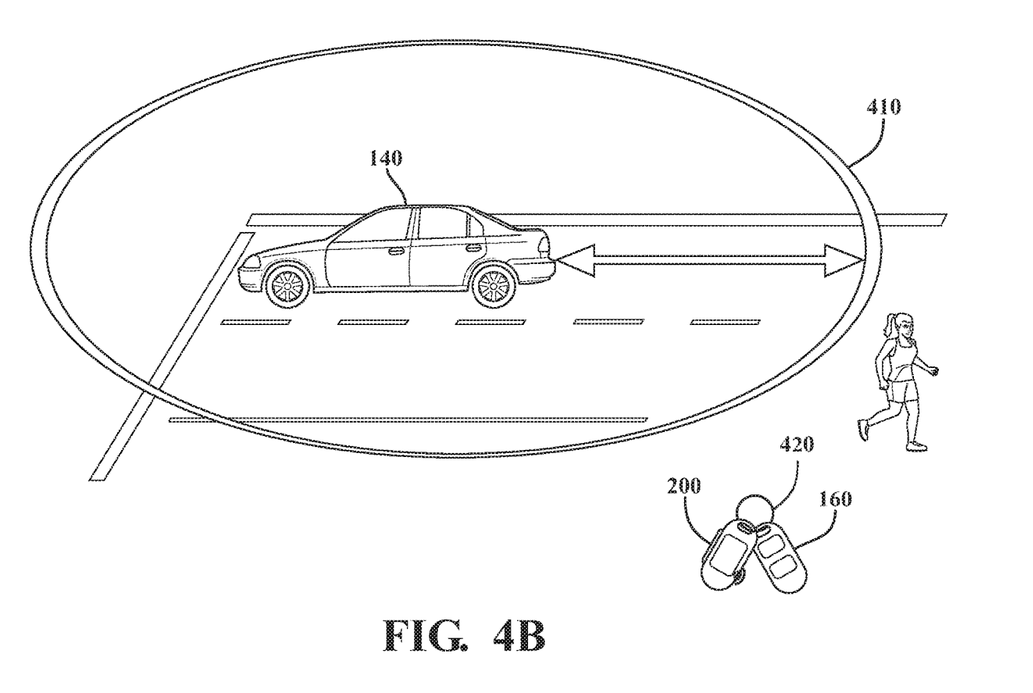

A non-limiting example of controlling communication with a key fob will now be described in relation to FIGS. 4A-4B. FIGS. 4A-4B show an example of a scenario in which communication with the key fob 160 is being controlled by a jamming device 200. A vehicle 140 having an RKE system 142, and as such, can be locked and/or unlocked by the key fob 160. The key fob 160 can be proximate to the jamming device 200. As an example, the key fob 160 and the jamming device 200 can be attached to a key holder 420 as shown. The jamming device 200 can include the sensor(s) 230, the transceiver(s) 240, the jamming condition detection module(s) 270, and the jamming control module(s) 272. The vehicle 140 can include a communication range 410 within which, the key fob 160 and the vehicle 140, including vehicle systems such as the RKE system 142, can communicate.

The jamming device 200, specifically, the sensor(s) 230 can emit a request signal, requesting a response from the vehicle 140. The vehicle 140 can transmit a response signal, upon receiving the request signal from the sensor(s) 230. The sensor(s) 230 can measure the time difference between when the sensor(s) 230 sent the request signal and when the sensor(s) 130 received the response signal. Based on the time difference and the speed of travel of the signals, the sensor(s) 230 can determine whether the vehicle 140, the jamming device 200, and by proximity, the key fob 160 are within the communication range 410.

As shown in FIG. 4A, the jamming condition detection module(s) 270 can determine that a key fob jamming condition has not been detected upon receiving sensor data indicating that the key fob 160 and the jamming device 200 are within the communication range 410 of the vehicle 140. In response to the jamming condition detection module(s) 270 determining that the key fob jamming condition has not been detected, the jamming control module(s) 272 can output a signal to deactivate the transceiver 240 from transmitting jamming signals. In cases in which the transceiver 240 was not transmitting jamming signals, the jamming control module(s) 272 may not output a signal, such that the transceiver 240 can remain deactivated. As no jamming signals are being emitted by the jamming device 200, the key fob 160 is able to receive and respond to signals from the vehicle 140 and its internal systems.

As shown in FIG. 4B, the jamming condition detection module(s) 270 can determine that a key fob jamming condition has been detected upon receiving sensor data indicating that the key fob 160 and the jamming device 200 are outside the communication range of the vehicle 140. In response to the jamming condition detection module(s) 270 determining that the key fob jamming condition has been detected, the jamming control module(s) 272 can output a signal to activate the transceiver 240 such that the transceiver 240 starts or continues to emit jamming signals. As jamming signals are being emitted by the jamming device 200, the key fob 160 is unable to receive and respond to signals from the vehicle 140 and its associated systems.

It will be appreciated that arrangements described herein can provide numerous benefits, including one or more of the benefits mentioned herein. For example, arrangements described herein can prevent a key fob from succumbing to relay attacks. Arrangements described herein can automatically activate the jamming device such no human intervention is required to activate, deactivate, or otherwise operate the jamming device. Arrangements described herein can prevent a vehicle being unlocked by an unauthorized entity. Arrangements described herein can prevent a vehicle from being started by an unauthorized entity.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As used herein, the term "substantially" or "about" includes exactly the term it modifies and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method for controlling communication with a key fob of a vehicle, the method comprising:
   determining whether a key fob jamming condition is detected, the key fob jamming condition being based on at least one of:
      a distance between the vehicle and a jamming device and/or the key fob when the jamming device and/or the key fob are located outside of the vehicle; and
      a communication range between the vehicle and the jamming device and/or the key fob when the jamming device and/or the key fob are located outside of the vehicle; and
   responsive to determining that the key fob jamming condition is detected, automatically activating the jamming device to cause one or more jamming signals to be emitted, whereby the one or more jamming signals prevent the key fob from receiving and responding to other signals.

2. The method of claim 1, wherein the key fob jamming condition is based on the distance between the vehicle and a jamming device and/or the key fob exceeding a threshold distance.

3. The method of claim 1, wherein the key fob jamming condition is based on the jamming device and/or the key fob being outside the communication range.

4. The method of claim 1, wherein the one or more jamming signals are based on at least an operational frequency range of the key fob.

5. The method of claim 1, further comprising:
   responsive to determining that the key fob jamming condition is not detected, deactivating the jamming device so that the one or more jamming signals are not emitted or maintaining the jamming device in a deactivated condition.

6. The method of claim 1, further comprising:
   responsive to determining that the key fob jamming condition is not detected, causing one or more other jamming signals to be emitted, wherein the one or more other jamming signals are configured to jam the one or more jamming signals, whereby the key fob is allowed to receive and respond to other signals.

7. The method of claim 1, wherein determining whether the key fob jamming condition is detected includes using at least one of Radio Frequency Identification (RFID), Wi-Fi, and Bluetooth, and ultra-wide band.

8. The method of claim 1, wherein the key fob includes at least one of a remote keyless entry device and a remote keyless ignition device.

9. The method of claim 1, wherein the automatically activating the jamming device to cause one or more jamming signals to be emitted further comprises:
   receiving, from the vehicle, a control signal; and
   responsive to receiving the control signal, emitting the one or more jamming signals.

10. A system for controlling communication with a key fob of a vehicle, the system comprising:
    one or more sensors;
    one or more jamming devices; and
    one or more processors, the one or more processors being programmed to initiate executable operations comprising:
       determining whether a key fob jamming condition is detected, the key fob jamming condition being based on at least one of:
          a distance between the vehicle and the one or more jamming devices and/or the key fob when the jamming device and/or the key fob are located outside of the vehicle; and
          a communication range between the vehicle and the one or more jamming devices and/or the key fob when the jamming device and/or the key fob are located outside of the vehicle; and
       responsive to determining that the key fob jamming condition is detected, automatically activating the one or more jamming devices to cause one or more jamming signals to be emitted, whereby the one or more jamming signals prevent the key fob from receiving and responding to other signals.

11. The system of claim 10, wherein the key fob jamming condition is based on the distance between the vehicle and the one or more jamming devices and/or the key fob exceeding a threshold distance.

12. The system of claim 10, wherein the key fob jamming condition is based on the one or more jamming devices and/or the key fob being outside the communication range.

13. The system of claim 10, wherein the one or more jamming signals are based on at least an operating frequency range of the key fob.

14. The system of claim 10, wherein the executable operations further comprise:
responsive to determining that the key fob jamming condition is not detected, deactivating the one or more jamming devices so that the one or more jamming signals are not emitted or maintaining the one or more jamming devices in a deactivated condition.

15. The system of claim 10, wherein the executable operations further comprise:
responsive to determining that the key fob jamming condition is not detected, causing one or more other jamming signals to be emitted, wherein the one or more other jamming signals are configured to jam the one or more jamming signals, whereby the key fob is allowed to receive and respond to other signals.

16. The system of claim 10, wherein determining whether the key fob jamming condition is detected includes using at least one of Radio Frequency Identification (RFID), Wi-Fi, Bluetooth, and ultra-wide band.

17. The system of claim 10, wherein the key fob includes at least one of a remote keyless entry device and a remote keyless ignition device.

18. The system of claim 10, wherein the executable operations further comprise:
receiving, from the vehicle, a control signal; and
responsive to receiving the control signal, causing the one or more jamming devices to emit the one or more jamming signals.

19. A computer program product for controlling communication with a key fob of a vehicle, the computer program product comprising a non-transitory computer readable medium having program code embodied therewith, the program code executable by a processor to perform a method comprising:
determining whether a key fob jamming condition is detected, the key fob jamming condition being based on at least one of:
a distance between the vehicle and a jamming device and/or the key fob when the jamming device and/or the key fob are located outside of the vehicle; and
a communication range between the vehicle and the jamming device and/or the key fob when the jamming device and/or the key fob are located outside of the vehicle; and
responsive to determining that the key fob jamming condition is detected, automatically activating the jamming device to cause one or more jamming signals to be emitted, whereby the one or more jamming signals prevent the key fob from receiving and responding to other signals.

20. The computer program product of claim 19, wherein the key fob jamming condition is based on the distance between the vehicle and the jamming device and/or the key fob exceeding a threshold distance or the jamming device and/or the key fob being outside the communication range.

* * * * *